United States Patent [19]
Veser

[11] Patent Number: 4,947,900
[45] Date of Patent: Aug. 14, 1990

[54] WINDING TEMPLATE FOR COILS DRAWABLE INTO THE STATOR OF AN ELECTRICAL MACHINE

[76] Inventor: Franz Veser, Kanalstrasse 16, 7980 Ravensburg, Fed. Rep. of Germany

[21] Appl. No.: 334,541

[22] Filed: Apr. 7, 1989

[30] Foreign Application Priority Data

Apr. 16, 1988 [DE] Fed. Rep. of Germany ....... 3812728

[51] Int. Cl.⁵ ............................................. B21F 3/04
[52] U.S. Cl. ............................... 140/92.1; 242/118.41
[58] Field of Search ........................... 140/92.1, 92.2; 242/118.41

[56] References Cited

U.S. PATENT DOCUMENTS

2,558,621 6/1951 Martilla ............................. 140/92.2

FOREIGN PATENT DOCUMENTS

| | | |
|---|---|---|
| 0180167 | 10/1985 | European Pat. Off. . |
| 811003 | 8/1951 | Fed. Rep. of Germany . |
| 1991024 | 8/1968 | Fed. Rep. of Germany . |
| 2953092 | 1/1985 | Fed. Rep. of Germany . |
| 2511515 | 3/1987 | Fed. Rep. of Germany . |

*Primary Examiner*—Lowell A. Larson
*Attorney, Agent, or Firm*—Spencer & Frank

[57] ABSTRACT

A special winding template for coils drawable into the stator of an electrical machine haa two template havles which can be slipped onto rotating carrier bars with an adjustable spacing. One of the template halves has, on the base side, a detachable coil support with a receiving orifice for a third carrier bar. To avoid always having to make a new winding templates for different types of windings and stator dimensions a modulator system is provided, so that templates of any constructional shape and size can be produced from a manageable number of different elements. Accordingly, a template half consists of a central piece (5) which can be slipped onto the respective carrier bar and of individual part templates (10) which each have a wire chamber and which can be slipped onto the central piece (5), the radial jump between individual part templates being selectable by means of spacer pieces (17) insertable between them. Magnetic clamping members between the central piece (5) and a coil support and the division of the latter into several supporting-chamber attachments allow a further variation and make it easier to work with winding templates of this type.

4 Claims, 2 Drawing Sheets

WINDING TEMPLATE FOR COILS DRAWABLE INTO THE STATOR OF AN ELECTRICAL MACHINE

BACKGROUND OF THE INVENTION

1. Field of the Invention

The invention relates to a winding template for coils drawable into the stator or an electrical machine. The template has two semicirular template halves which are located diametrically opposite one another relative to the winding axis and which are divided into wire chambers and which can be slipped onto rotating adjustably spaced carrier bars of a coil-winding machine. One of the template halves has, on the base side facing away from the wire chambers, a detachable coil support, on which is formed a receiving orifice parallel to the winding axis and intended for the third carrier bar and the supporting surfaces of which are stepped in accordance with the wire chambers.

2. Background Art

A winding template of this type is known from European Preliminary Publication No. 0,180,167, FIGS. 9 to 11. The template halves have one-piece template sets which, for the winding of several coils, are equipped with several stepped wire chambers of differing radii. The coil support is also one-piece and has a square receiver which can be inserted into the template set on the base side.

The continuous refinement of the drawing-in technique, especially of the methods of transferring the coils from the winding templates onto the drawing-in tool, has increased the requirements demanded of the individual dimensions of the coils. There is therefore a need for templates which, on the one hand, have widely differing radii of curvature and, on the other hand, are arranged on the winding machine with differing distances between the mutually assigned template halves. Differing lengths of turn are obtained thereby. However, with one-piece template sets with wire chambers of identical or differing radii of curvature, it is not possible to adjust the "jump", that is to say the difference between the greatest distances of the supporting surfaces of two adjacent wire chambers from the winding axis. To produce multi-hole windings of a count of two or more, template sets with two or more chambers are necessary, and therefore, because of differing stator sizes, the number of winding templates required becomes incalculable. If, for example, in four-chamber template sets, only two chambers are occupied for reasons of economy, the degree of utilisation of the winding machines is unsatisfactory.

SUMMARY OF THE INVENTION

The object on which the invention is based is to provide a modular system, by means of which it is possible, from individual parts having a manageable number of shapes and sizes, to construct winding templates which can be combined freely in fine gradations in terms of the number of chambers, the radii of curvature and the jumps, so that the winding machine is also always fully utilised.

In a winding template of the type designated in the introduction, this object is achieved, according to the invention, because the template halves have a central piece which can be slipped onto the respective carrier bar, and individual part templates which each have a wire chamber and which can be slipped onto the central piece, the distance between the base of the part templates and the carrier bar being adjustable or selectable. The latter is equivalent to the adjustment or selection of the jump and can preferably be put into effect by inserting a spacer piece of specific thickness between the part template and the central piece or by providing a clamping arrangement, so that continuous adjustment is possible or specific positions can be detected by means of notches.

Both the central piece and the part templates are appropriately produced as injection mouldings from plastic, and because of the accuracy thereby possible and the elasticity of the plastic the plug connections are so reliable and firm that the part templates remain attached to the central piece despite the centrifugal forces occurring during winding. Moreover, the advantages of the invention are afforded even when individual parts of the winding templates assembled in modular form are connected to one another permanently, for example by adhesive bonding. Preferably, the central pieces will be kept in stock in sizes for two, three or four part templates, so that the template halves thus obtained can be handled in the same way as known template sets.

It has proved to be a disadvantage of the known winding template that the coil support can be assembled together with the template set only outside the carrier bar of the winding machine and that the release of the plug connection between them after take-over by the third carrier bar is relatively complicated. In a development of the invention, therefore, it is proposed that the central piece and the coil support be equipped, for the purpose of mutual releasable fastening, with clamping magnets and iron plates. Thus, winding can be carried out without the coil support, and only after the coils have been completed is the coil support attached to the upper template half. This also contributes to the more efficient utilisation, in terms of time, of the coil supports which, during winding, are still required for transferring the coils previously wound. Furthermore, after the reversal, the central piece together with its part templates can be removed more easily from the coil support carrying the coils, by being tilted about the carrier-bar axis.

Where the coil supports are concerned, the same problem of matching arises as regards the number of wire chambers and the mutual jumps, since, in particular, the jumps should correspond exactly to the jumps on the particular template half. It is therefore proposed that the coil support consist of a mounting strip receivable by the third carrier bar and similar to the central piece and of individual supporting-chamber attachments of differing heights which can be slipped onto the mounting strip. Here too, spacer plates can be inserted in order to obtain differing jumps.

An exemplary embodiment of the invention is explained below by means of the drawings. FIGS. 1 to 5 show the individual parts of the winding template in cross-section along the sectional line indicated in FIG. 6. In particular, in actual size.

DETAILED DESCRIPTION OF PREFERRED EMBODIMENTS

Figure 6:
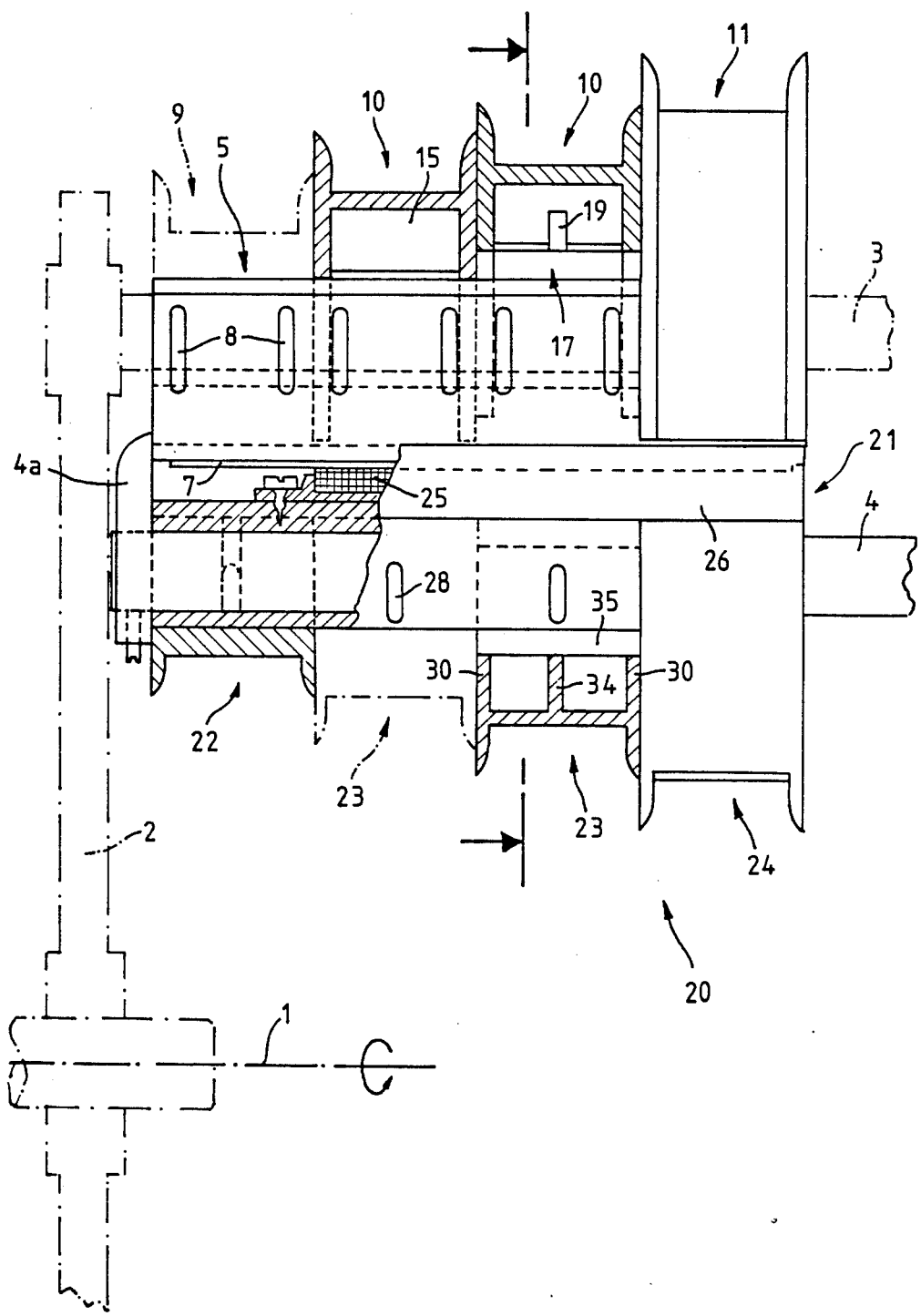
FIG. 6 shows a side view of a template half with a coil support, some of the individual parts being shown in section.

In FIG. 6, the winding axis is denoted by 1. Arranged on the equiaxial shaft of an automatic winding machine is a two-armed rotary arm 2, to the ends of which are attached two axis-parallel carrier bars 3 which have a square cross-section and of which only one is shown. After the coils are completed, the template half shown (or, if appropriate, several template halves arranged in a row on the carrier bar 3) is removed be means of a freely movable third carrier bar 4 inserted into the mounting strip yet to be described.

The central piece 5 is slipped onto the carrier bar 3 by means of its square orifice 6 continuous in the longitudinal direction. This central piece has a general rectangular cross-sectional profile, is slightly bevelled at the top and on the underside carries an iron plate 7 which is preferably divided into individual small plates loosely attained. In the example, the length of the central piece 5 corresponds to four times the width of a part template, so that four such part templates are accommodated on it. The four mounting locations are each fixed by means of two ribs 8 on the side faces, so that eight ribs 8 are formed at appropriate distances from one another on each of the two sides of the central piece 5.

The part templates 9, 10 and 11, also called template boxes or coil-winding-template part, have different radii of curvature. The medium size with a radius of 45 mm occurs twice in FIG. 6. Each part template has a supporting wall 12 in the form of half of a circular cylinder and two side walls 13, each with a rectangular cutout 14 corresponding to the outer form of the central piece 5. The supporting wall and the side walls are connected to one another by means of a short rib 15. The side walls 13 project radially beyond the supporting wall 12 and form the retaining edges 16 of the part template, the inner surface of which merges into the outer surface at the edge at an acute angle via a rounded portion.

Figure 1:
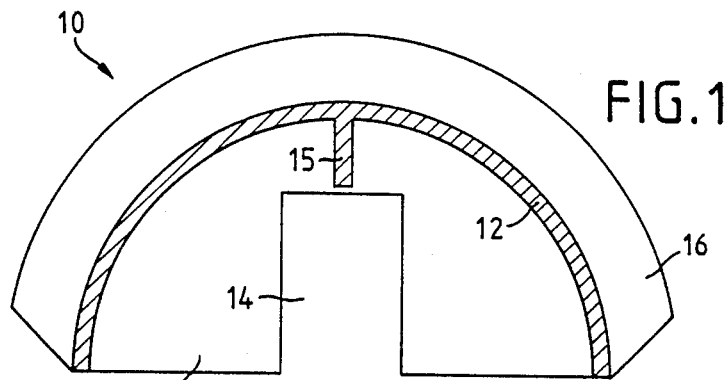
FIG. 1 shows a slip-on part template.
Figure 2:
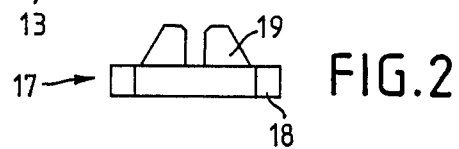
FIG. 2 shows a spacer piece insertable into the part template of FIG. 1.
Figure 3:
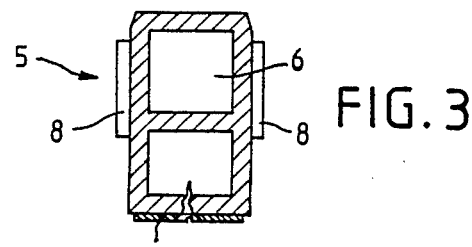
FIG. 3 shows a central piece for slipping onto one of the carrier bars of the winding machine.

A spacer piece 17, shown in detail in FIG. 2, has the form of a rectangular plate with corner cutouts 18, so that it fits into the cutouts 14 and between the side walls 13 of the part templates. A rib 19 slotted perpendicularly to the plate fits over the rib 15 and thereby holds the spacer piece firmly in the part template.

The part templates slipped onto the central piece 5 according to FIG. 6 have (from left to right) jumps of 7.5, 5 and 10 mm. The jump between the two identical middle part templates 10 is obtained by means of the spacer piece 17 inserted into the one part template. Appropriately, spacer pieces are provided in a reasonable thickness gradation range. Should a narrow radial gap occur between the side walls of adjacent part templates as a result of production inaccuracies, this does not cause any disruption during winding, since the winding machine is controlled automatically in such a way that the leading winding-wire eye jumps over the long distance from one wire chamber to the next.

Figure 4:
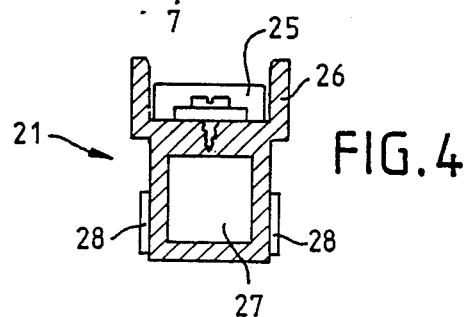
FIG. 4 shows a mounting strip attachable magnetically to the central piece of FIG. 3.
Figure 5:
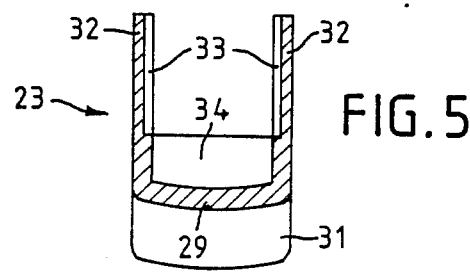
FIG. 5 shows a supporting-chamber attachment for the mounting strip of FIG. 4.

The removable coil support 20 is described hereafter. In a similar way to the central piece 5, a mounting strip 21 (FIG. 4) forms the connecting element between the carrier bar 4 and the individual coil-removing template parts or supporting-chamber attachments 22, 23 and 24, from which the coil support 20 is formed in the example. Furthermore, the mounting strip 21 makes the connection with the central piece 5 or its magnetic plate 7 by means of a clamping magnet 25 which is inserted into the upper part of U-shaped cross-section of the mounting strip 21. Assembly becomes easier because the side walls 26 of the U-shaped upper part project above the clamping magnet 25 and come laterally up against the central piece 5. Receiving the carrier bar 4, the mounting strip 21 also has a continuous square orifice 27 and, for fixing the mounting locations for the supporting-chamber attachments, four guide ribs 28 formed on, on each side face.

The supporting-chamber attachments or coil-removing template parts 22 to 24 approximately match with their side walls 29 the curves of the part templates, but extend only over a small arc and are correspondingly narrow. In the supporting-chamber attachments, the end walls 30 (FIG. 6), projecting as retaining edges 31 above the supporting wall, correspond to the side walls of the part templates. Clamping walls 32 perpendicular thereto come laterally up against the mounting strips and receive the guide ribs 28 by means of grooves 33 made on the inside. Furthermore, for the purpose of reinforcement, the higher supporting-chamber attachments also have a middle rib 54 parallel to the end walls 30.

According to FIG. 6, the two middle supporting-chamber attachments 23 are likewise identical to one another. However, a change in height or jump between the supporting walls is obtained by inserting a simple spacer plate 35 between the mounting strip 21 and the respective supporting-chamber attachment, the general result of this being the same jumps as in the part templates.

Work with the winding template described is carried out as follows: for winding purposes, it is sufficient to attach identical template halves, that is to say both without a coil support, on the two carrier bars 3 (one is not shown). After the coils have been completed, the coil support is attached to one of the two template halves according to FIG. 6, so that the magnet 25 clamps to the iron plate 7. The carrier bar 4 is then inserted.

However, if several winding templates have been wound, several coil supports can also be arranged in a row on the carrier bar 4 beforehand and then attached jointly. Attached to the front of the carrier bar 4 is a nose 4a which engages behind the central piece 5 and which thereby exerts the force necessary for drawing off this and, if appropriate, further central pieces 5 from the carrier bar 3. The magnetic clamping force would not be sufficient for this. After drawing off from the carrier bars of the winding machine, the upper template halves are held solely by the carrier bar 4 via the attached coil supports 21, whilst the lower template halves hang in the coils.

The carrier bar 4 is now rotated through 180° about its longitudinal axis, the four coils laying themselves into the wire chambers of the supporting-chamber attachments, whilst the part templates stand empty at the bottom. They can now be released by means of a brief tilting movement about the longitudinal axis of the magnet 25 and taken out of the coils in a position rotated through 90°. Furthermore, after the lower template half has been taken out of the coils, the coils can be taken away from the coil support and inserted into the transfer or drawing-in tools for further processing.

What is claimed is:

1. Winding template assembly for use with a coil winding machine having a carrier bar and a coil-removing carrier bar parallel to and spaced from the carrier bar, said winding template assembly comprising:

an elongated central piece having a longitudinal axis and an orifice defined longitudinally therethrough, said orifice being longitudinally coaxially receivable over the carrier bar;

a pair of separate first and second template halves, said first template half including a plurality of detachable individual semicircular first template parts with semicircular surfaces having various radii of curvature, said first template parts being coil-winding template parts with a wire chamber defined on the semicircular surfaces, and each coil-winding template part having a central-piece-receiving groove for being received on said central piece in a direction substantially perpendicular to the longitudinal axis of said central piece, said second template half including a plurality of semicircular surfaces, said second template half being a coil-removing template half with coil-supporting chambers defined on the semicircular surfaces of said second template half; and means for individually varying the distance between said elongated central piece and each one of said plurality of coil-winding template parts for varying the distance between the wire chambers and the carrier bar for varying the size of a coil winding.

2. A winding template assembly as defined in claim 1, wherein said means for individually varying the distance between said elongated central piece and a selected one of said coil-winding template parts includes a spacer insertable between said central piece and the selected coil-winding template part.

3. A winding template assembly as defined in claim 1, further comprising an iron plate on said elongated central piece, an elongated mounting strip having an orfice defined longitudinally therethrough, said orifice being longitudinally coaxially receivable over the coil-removing carrier bar, an elongated clamping magnet attached to said elongated mounting strip for magnetically attaching said mounting strip to said central piece, and means on said coil-removing template half for detachably attaching said coil-removing template half to said elongated mounting strip.

4. A winding template assembly as defined in claim 1, further comprising an elongated mounting strip having an orifice defined longitudinally therethrough, said orifice being longitudinally coaxially receivable over the coil-removing carrier bar, and said coil-removing template halves being of varying heights and being detachably mounted on said mounting strip for varying the distance between said elongated mounting strip and each one of said coil-removing template halves for varying the distance between the individual coil-supporting chambers and the coil-removing carrier bar.

* * * * *